United States Patent [19]
Ono

[11] Patent Number: 4,536,011
[45] Date of Patent: Aug. 20, 1985

[54] POSITION ADJUSTER FOR SEAT BELT

[75] Inventor: Katsuyasu Ono, Fujisawa, Japan

[73] Assignee: NSK-Warner K. K., Japan

[21] Appl. No.: 577,280

[22] Filed: Feb. 6, 1984

[30] Foreign Application Priority Data

Feb. 14, 1983 [JP] Japan .............................. 58-18985[U]
Feb. 23, 1983 [JP] Japan .............................. 58-24254[U]

[51] Int. Cl.³ ............................................. B60R 21/10
[52] U.S. Cl. .................................... 280/808; 297/483;
297/486
[58] Field of Search ............... 280/801, 802, 804, 808;
297/468, 473, 483, 486

[56] References Cited

U.S. PATENT DOCUMENTS

| | | | |
|---|---|---|---|
| 3,964,798 | 6/1976 | Burleigh | 280/808 |
| 4,056,282 | 11/1977 | Nordh | 280/808 |
| 4,398,749 | 8/1983 | Hipp et al. | 280/801 |
| 4,398,751 | 8/1983 | Wahlmann et al. | 280/808 |
| 4,466,666 | 8/1984 | Takada | 280/808 |
| 4,470,618 | 9/1984 | Ono | 280/808 |

FOREIGN PATENT DOCUMENTS

| | | | |
|---|---|---|---|
| 2625572 | 12/1977 | Fed. Rep. of Germany . | |
| 3126868 | 4/1982 | Fed. Rep. of Germany . | |
| 2362641 | 3/1978 | France | 280/808 |
| 1497397 | 1/1978 | United Kingdom | 280/808 |
| 2070414 | 9/1981 | United Kingdom . | |
| 2081568 | 2/1982 | United Kingdom | 280/808 |

Primary Examiner—Joseph F. Peters, Jr.
Assistant Examiner—Kenneth R. Rice
Attorney, Agent, or Firm—Shapiro and Shapiro

[57] ABSTRACT

A device for adjusting the support position of a seat belt includes a base, an adjustable anchor to be guided along the base, a latch member mounted on the anchor between two positions, an operation member for bringing the latch member from one position to the other position through a two-step operation in two different directions, and a device for allowing the movement of the latch member from the one position to the other position only when the two-step operation of the operation member is accomplished. The anchor is fixed to the base when the latch member takes the one position, while the anchor is movable along the base when the latch member takes the other position.

7 Claims, 24 Drawing Figures 4,536,011

POSITION ADJUSTER FOR SEAT BELT

BACKGROUND OF THE INVENTION

1. Field of the Invention

The present invention generally relates to a seat belt for securing the driver or passenger in a vehicle. More particularly the invention relates to a device for adjusting the support position of the seat belt by adjusting the position of a suitable member of a seat belt system such as anchor, through-anchor or retractor.

2. Description of the Prior Art

In a conventional seat belt system, the shoulder anchor is usually mounted on the center pillar in a vehicle and the position of the shoulder anchor is fixed. Because of the shoulder anchor being fixed, the state of the seat belt folded back by the anchor where the anchor is a through-anchor can not be always suitable to all of the users who are different in physical constitution. Some wearers feel uncomfortable. Moreover, if the seat belt does not well fit the wearer, the safety by the seat belt can not be assured to the wearer.

In order to overcome the above-mentioned drawback of the conventional seat belt system, it has already been proposed to make a suitable member of the seat belt system, such as a shoulder anchor, movable and adjustable in position. The use of such an adjustable shoulder anchor allows the user to wear the seat belt more comfortably and safely because he can adjust the state of the seat belt to the structure of his body at his will.

With the use of such an adjustable shoulder anchor in a seat belt system, various means for adjusting the set position of the anchor also have been proposed in these years. In all of the known devices hitherto proposed for this purpose there is used an operation member by which the anchor is brought into a movable state from a fixed state. The operation member is so designed as to be actuated by only one-step operational motion. The action of the user needed to operate the member is only to rotate or pull it in one step. Therefore, the operation member is very easily operable. However, on the other hand, there is a large possibility that the operation member may be operated unintentionally and accidentally. For example, if any part of the wearer's body or any object touches the operation member accidentally, then the latter may be actuated to render the anchor movable, which means a danger to the wearer of the seat belt. In this case, the anchor unexpectedly begins to move and the belt gets in the state unable to secure the wearer properly. There may occur such accident that the wearer's body is struck against the front panel of the car.

SUMMARY OF THE INVENTION

Accordingly, it is an object of the present invention to remove the possibility of danger as mentioned above.

More specifically the object of the present invention is to provide an improved position adjuster for a seat belt which can not be operated unintentionally and accidentally and which is actuated only when an operation member is intentionally operated by a two-step operation in different directions. The adjustable anchor or the like is never allowed to become movable unless the operation member is operated by the user through a first step operational motion in a first direction followed by a second one in a second direction.

Other and further objects, features and advantages of the present invention will appear more fully from the following description taken in connection with the accompanying drawings.

DESCRIPTION OF PREFERRED EMBODIMENTS

Figure 1:
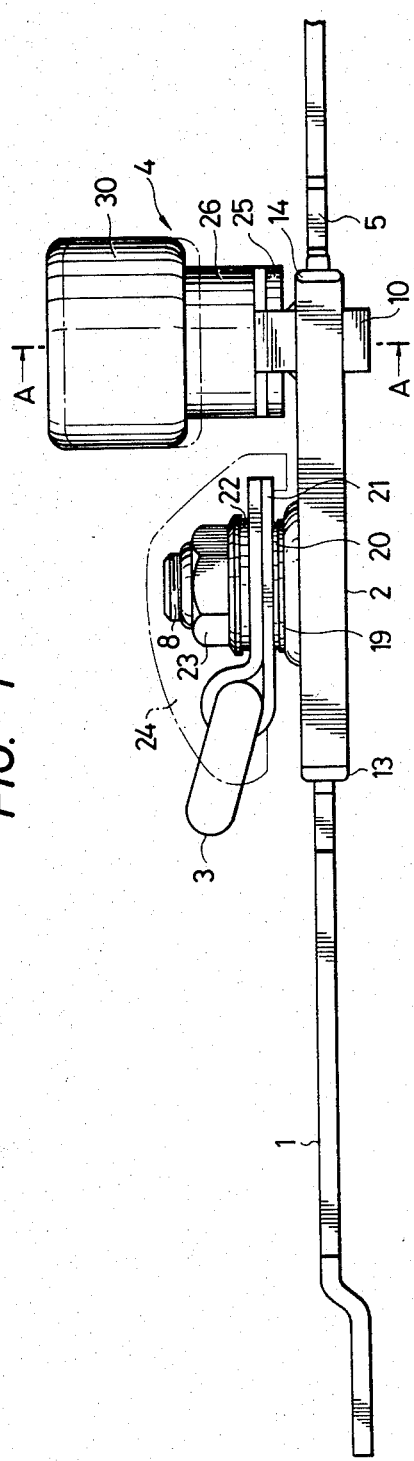
FIG. 1 is a front view showing a first embodiment of the invention.

Referring first to FIG. 1 showing the first embodiment of the present invention a member designated by a reference numeral 1 is a base serving as a guide member along which an adjustable anchor 2 is movable. A through-anchor 3 and an anchor setting (latch/unlatch) mechanism 4 are mounted on the adjustable anchor 2. The through-anchor 3 which a belt passes through serves as a belt supporting member. The through-anchor 3 is mounted movable in the manner of gooseneck. The anchor setting mechanism 4 is a mechanism by which the anchor 2 is fixed in a desired position or released from the fixed position for movement.

Figure 2:
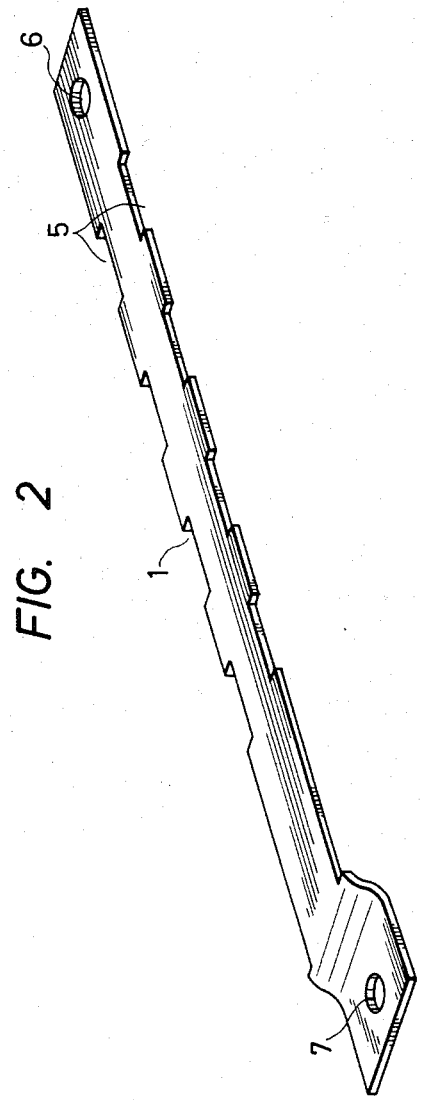
FIGS. 2 to 5 and 7 to 9 are detailed perspective views of the respective members of the first embodiment.

FIG. 2 shows the structure of the base 1. As clearly seen in FIG. 2, the base 1 has plural pairs of latch portions 5 formed along the long sides of the base 1. Also it has two holes 6 and 7 at its both ends. The base 1 can be fixed, for example, to the center pillar of a vehicle by means of bolts passing through the bolt holes 6 and 7.

Figure 3:
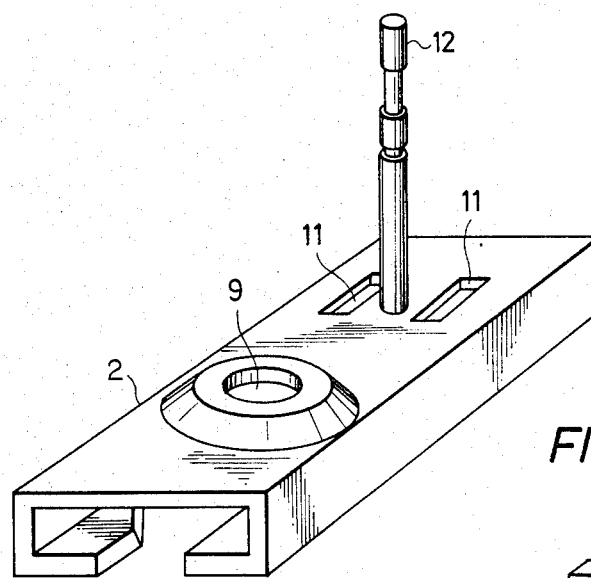
Figure 4:
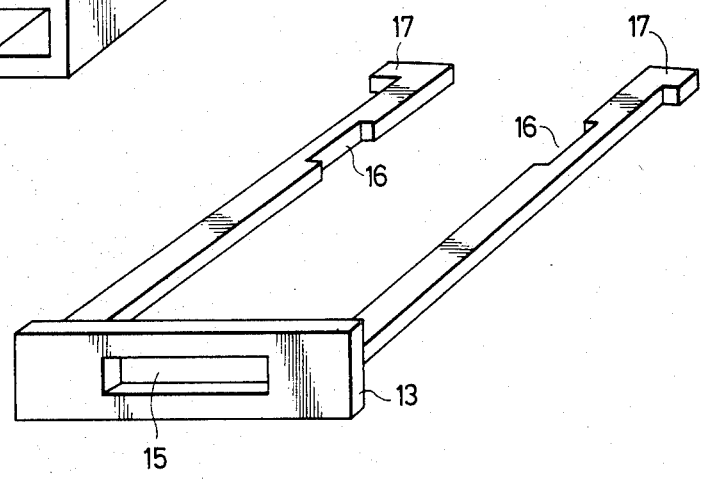
Figure 5:
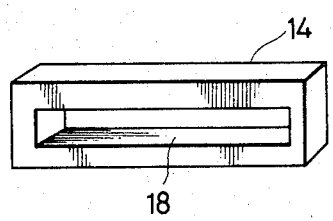

The adjustable anchor 2 has a C-shaped cross section as seen in FIG. 3. The anchor 2 has a bolt hole 9 and a pair of elongate openings 11. The hole 9 is provided to receive a bolt 8 (FIG. 1) for mounting the through-anchor 3 on the anchor 2. The elongate openings 11 are provided to receive a latch member 10 (FIG. 1) which engages with the latch portions 5 of the base 1. A stud pin 12 stands on the anchor 2. The afore-mentioned mechanism 4 is mounted on the pin 12. A slider 13 (FIG. 4) is fitted in the anchor 2 from one end and a slider clip 14 (FIG. 5) is fitted therein from the other end. The slider 13 and the slider clip 14 assure the smooth slide movement of the anchor 2 along the base 1.

The slider 13 has an elongate opening 15 which the base 1 passes through, a pair of cutouts 16 each of which provides a relief space for the latch member 10, and a or outward projections 17 which engage with the or the anchor 2 through the slider clip 14. The slider clip 14 also has an elongate opening 18 which the base 1 passes through.

The through-anchor 3 is mounted on the anchor 2 in the following manner:

At first the bolt 8 is passed through the hole 9 of the anchor 2 from under. Then, a collar 19, a silencer 20, the fitting portion 21 of the through-anchor and a second silencer 22 are fitted on the bolt. Lastly the bolt is fastened by means of a screw nut 23. After mounting, the bolt head, the nut and all the elements fixed by the bolt and nut are covered by a cover member 24 as a whole excepting only the part of the through-anchor 3 to be used for the pass-through of the belt as suggested by the phantom line in FIG. 1.

Figure 6:
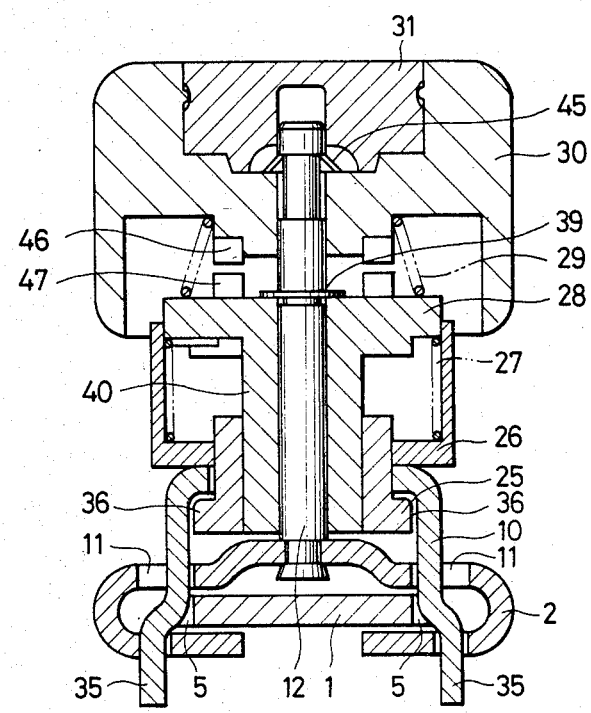
FIG. 6 is a sectional view taken along A—A in FIG. 1.
Figure 7:
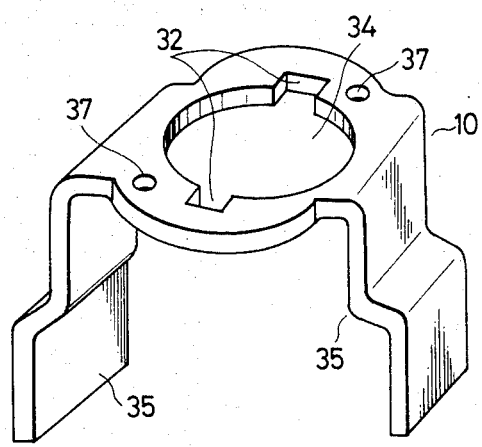
Figure 8:
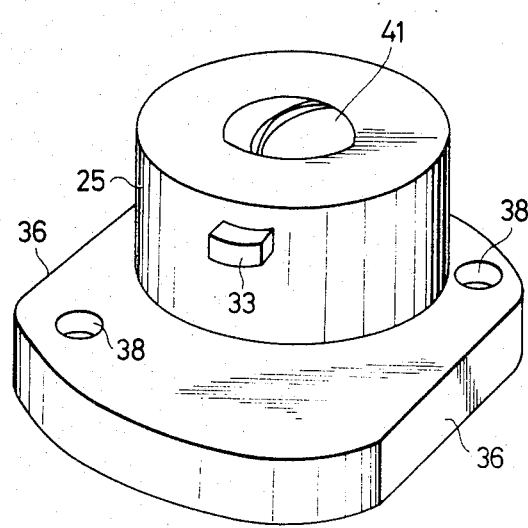

The anchor setting mechanism 4 is composed of a release arm 25, the above-mentioned latch member 10, a spring cover 26 covering a spring 27, a release shaft 28, a spring 29, a release knob 30 and a cap 31. These elements are mounted on the stud pin 12 in the named order as seen best in FIG. 6 that is a sectional view taken along A—A in FIG. 1. FIGS. 7 and 8 show the details of the latch member 10 and the release arm 25 respectively. The latch member 10 has a pair of cutouts 32 and the release arm 25 has a pair of projections 33 (only one of which is seen in FIG. 8). The latch member 10 and the release arm 25 can be assembled together by aligning the projections 33 with the cutouts 32 and then inserting the release arm 25 into the latch member 10 through a through-hole 34 of the latch member. In the assembled state, the legs 35 of the latch member 10 extend downwardly passing over the cutout portions 36 of the release arm 25. The spring-receiving holes 37 provided in the latch member 10 are in alignment with corresponding spring-receiving holes 38 in the release arm 25. The leg portions 35 of the member 10 are designed to engage with the base 1.

The release shaft 28 is rotatable about the pin 12. But, an E-ring 39 prevents the axial movement of the shaft 28 along the pin 12. The release shaft 28 has a screw thread formed on its cylindrical portion 40. The screw thread has a pitch angle of about 15°-30° and is in mesh with correspondingly formed screw groove 41 on the inner wall of the release arm 25. In this screw-coupled state, the release shaft 28 and the release arm 25 fitted on the shaft together serve as an operation transmitting means as will be described in detail later.

Figure 9:
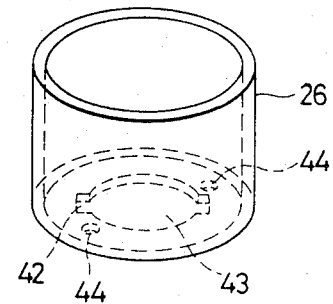

The detailed form of the spring cover 26 is shown in FIG. 9. The spring cover 26 has a pair of cutouts 42 and a pair of spring holes 44. Aligning the cutouts 42 with the projections 33 of the release arm 25, the latter is inserted into the spring cover 26 and then the spring cover 26 is rotated until the spring holes 44 on it gets in alignment with the similar spring holes 38 and 37 formed on the release arm 25 and the latch member 10. Thereafter, the leg of the latch spring 27 is inserted into the aligned spring holes 37, 38 and 44. By the latch spring 27 passed through the holes 37, 38 and 44, the three members 10, 25 and 26 are united together into a unit. As seen in FIG. 6, the upper end of the spring 27 is received by the underside surface of the flange portion of the release shaft 28.

Figure 10:
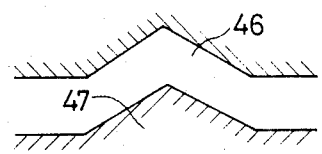
FIG. 10 is a view illustrating the engagement between the release button and the release shaft in the first embodiment.

Above the release shaft 28 there is mounted the release knob 30 serving as a manual operation member. The knob 30 is mounted on the pin 12 through a push nut 45 for movement along the pin 12 and also for rotation about the pin 12. Between the release shaft 28 and the release knob 30 there is disposed a bias spring 29 which intends to move the knob 30 upwardly. The release knob 30 has holes 46 formed on the under surface of the knob. Each the hole 46 is so formed as to have a triangular cross-section as shown in FIG. 10. When the release knob 30 is pushed down against the biasing force of the spring 29, the triangular (in section) holes 46 come into mesh with the corresponding projections 47 (FIG. 10) formed on the release shaft 28 so that the rotation of the release knob subsequent to the push-down can be transmitted to the release shaft 28.

The manner of operation of the above-described first embodiment is as follows:

In case that the seat belt wearer feels the position of the shoulder belt unsuitable to him, the wearer can adjust the position of the through-anchor which the shoulder belt passed through. To attain the adjustment, the wearer has to at first push down the release knob 30 toward the car body side (in the direction suggested by the phantom in FIG. 1). Thereby the holes 46 of the release knob 30 come into engagement with the opposed projections 47 of the release shaft 28 to form a connection between the knob 30 and the shaft 28. In this state, the wearer rotates the knob 30 as the second step of operation. This rotation of the knob is transmitted to the release shaft 28. As previously described, the release shaft 28 can not move axially and the assembled unit consisting of the latch member 10, release arm 25 and spring cover 26 can not rotate about the pin 12. Consequently, the rotation of the release shaft 28 transmitted from the knob 30 causes the assembly 10, 25, 26 to move toward the car body side (upwardly as viewed in FIG. 6) through the above-mentioned screw-coupling between the release shaft 28 and the release arm 25. In this stage of operational motion, the rotation of the knob 30 is transmitted through the engagement between the holes 46 and projections 47 in a triangular form in section. If any excess torque is applied to the release knob 30, then the engagement becomes out and therefore rotation of the knob 30 is no longer transmitted to the release shaft 28. In other words, the engagement portions 46, 47 function as a torque limiter which prevents the related members from being damaged by such an excess force.

With the above upward movement of the assembly 10, 25 and 26, the leg 35 of the latch member 10 also moves upwardly starting from the position shown in FIG. 6. In the position shown in FIG. 6, the narrow-spaced portion of the legs 35 is latched in the latch portions 5 of the base 1. The latch member 10 is in a latched state relative to the base 1. Now, since the legs 35 of the latch member are moved upwardly, the narrow-spaced portion of the legs 35 leaves the latch portion 5 of the base and the wide-spaced portion of the legs 35 comes up to the area near the latch portions 5 of the base. The wide-spaced portion of the legs 35 can not engage with the latch portions 5 of the base. In this manner, the latch member 10 is unlatched relative to the base 1. In this unlatched state, the spring 27 is in its compressed state and the spring force is stored therein.

In the adjustable state, the wearer moves the adjustable anchor 2 to a desired position along the base 1 while pressing the release knob 30 against the force of the springs 27 and 29. When the adjustable anchor 2 reaches the desired position and the wearer stops pressing the release knob 30, the latter is moved up away from the release shaft 28 by the force of the spring 29. Now, the release shaft 28 is allowed to rotate freely even if the wearer holds the knob without pushing it down. Therefore, the latch member 10 is moved in the direction for latch by the stored force of the spring 27 and at the same time the release shaft 28 is rotated in the opposite direction to the direction for the above-described latch operation.

In this downward movement of the latch member 10, if the latter is in alignment with any new latch portions 5 of the base 1, the narrow-spaced portion of the legs 35 of the latch member will engage with the new latch portions 5 thereby producing new latched relation between the latch member 10 and the latch portions 5 of the base 1. Thus, a position adjustment of the adjustable anchor 2 is completed. On the contrary, if the position of the latch member 10 and the position of the new latch portion 5 of the base are out of alignment with each other, the assembly 25, 26, 10 will stop at the middle of the course of its downward movement. In this case, the wearer moves the adjustable anchor 2 a little further forwards or backwards along the base 1 by means of the release knob 30 without pushing it down. As soon as the latch member 10 gets in alignment with the new latch portions 5, the narrow-spaced portion of the legs 35 of the latch member 10 falls into the latch portions 5 automatically by the force of the spring 27. Thus, a new latched relation is produced between the latch member 10 and the base 1. At the time, a position adjustment of the adjustable anchor 2 is completed.

The first embodiment described above has many advantages. Since the latch/unlatch mechanism 4 is positioned at the center of the latch member 10, the latter is never inclined from its normal position even if there is some mounting error of the latch member. Therefore, the latch member 10 can always be moved very smoothly. The release knob and the release shaft are formed as two separate members which are engageable with each other. The engaging part of the two members functions also as a torque limiter. This is another advantage of this embodiment.

In the above embodiment, the through-anchor 3 which the shoulder belt passes through has been mounted on the adjustable anchor 2. And the base 1 for guiding the adjustable anchor has been mounted to the center pillar of a vehicle. However, it is to be understood that the above embodiment can be variously modified. For example, instead of the shown through-anchor, there may be used also a retractor, anchor or the like. Further, the base 1 may be mounted to any suitable part of a vehicle other than the center pillar. In the shown embodiment, the latch positions have been a set discretely. However, it is apparent that the latch positions can be set steplessly by a simple change of the design. The directions in which the operation member should be manually moved are never limited to the directions concretely shown in the above embodiment. The thing essential for the operation member is only that it should be operated in different directions at two steps.

Figure 11:
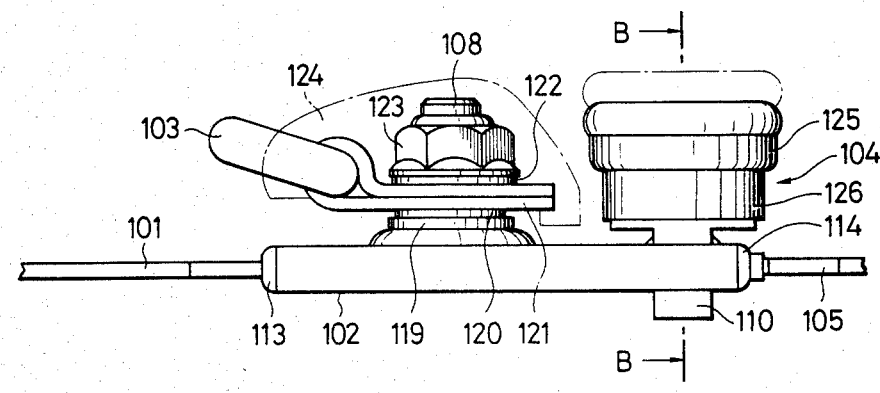
FIG. 11 is a front view showing a second embodiment of the invention.

FIG. 11 shows a second embodiment of the invention.

Again, a base 101 carries an adjustable anchor 102. The adjustable anchor is movable along the base 1 serving as a guide member. Mounted on the adjustable anchor 102 are a through-anchor 103 which a belt (not shown) passes through, and an anchor latching/unlatching mechanism 104 by which the adjustable anchor 102 is fixed in position to the base 1 or released from latch for movement along the base for position adjustment. Like that shown in the first embodiment, the through-anchor 103 is mounted for movement in the fashion of gooseneck. The structure and function of the base 101 are entirely the same as the base 1 of the first embodiment shown in FIG. 2.

Figure 12:
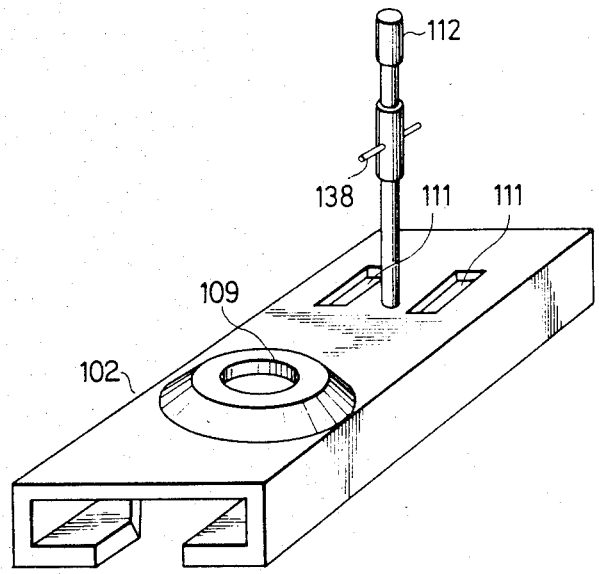
FIGS. 12, 14 and 15 are detailed perspective views of the respective members of the second embodiment.

FIG. 12 is a perspective view of the anchor 102. As seen in the figure, the anchor 102 has a C-shaped cross section and is provided with a bolt hole 109, a pair of elongate holes 111 and a stud pin 112. The bolt hole 109 is provided for a bolt 108 (FIG. 11) by which the through anchor 103 is fixed. The pair of elongate holes are for a latch member (FIG. 11) which is turn engageable with the latch portions 5 of the base 101. The stud pin is used for mounting the above-mentioned mechanism 104. To the adjustable anchor 102, a slider 113 is fitted from one end side of the anchor and a slider clip 114 is fitted from another end side thereby assuring a smooth slide-movement of the anchor along the base 101. The slider 113 and clip 114 correspond to the slider 13 and clip 14 of the first embodiment.

The through-anchor 103 is mounted in the same manner as previously described in connection with the first embodiment.

At first the bolt 108 is inserted through the bolt hole 109 of the anchor from under. Then on the bolt 108 are fitted a collar 119, a silencer 120, a mounting portion 121 of the through-anchor 103 and a second silencer 122 in the named order. Finally, the bolt 108 with the elements fitted thereon is fastened by means of a nut 123. This exposed part is covered by a cover member 124 with only the belt pass-through portion of the through-anchor 103 being left exposed as suggested by the phantom in FIG. 11.

Figure 13:
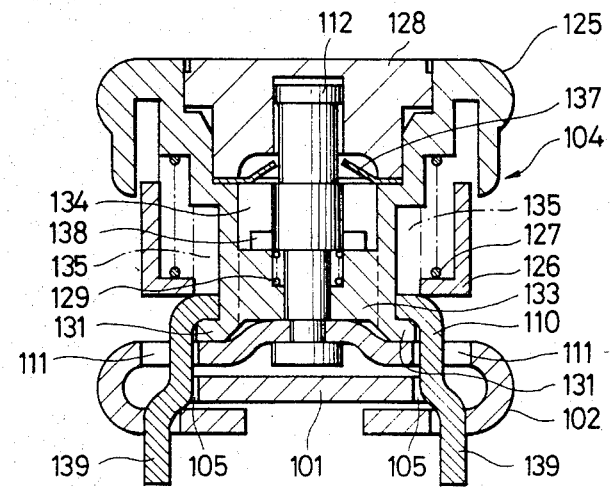
FIG. 13 is a sectional view taken along B—B in FIG. 11.

The detailed structure of the anchor latching/unlatching mechanism 104 is shown in FIG. 13 that is a sectional view taken along B—B in FIG. 11.

Figure 14:
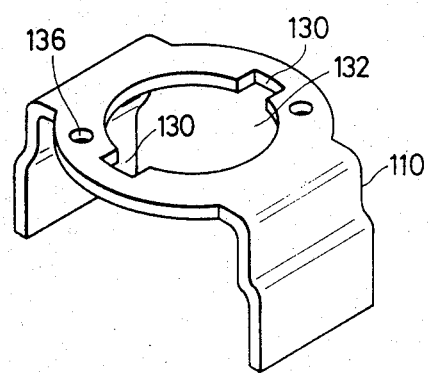
Figure 15:
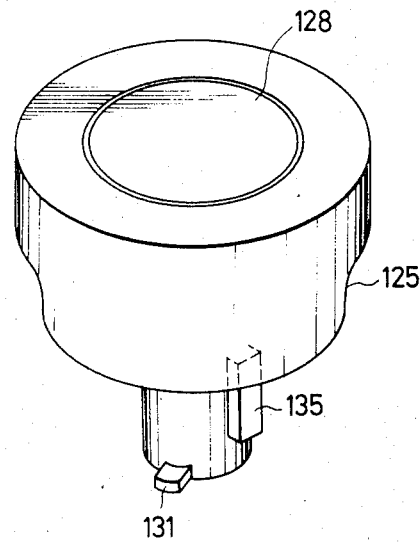

The mechanism 104 comprises a release shaft 125, the abovementioned latch member 110, an assembly of spring cover 126 and latch spring 127 and a cap 128, all of these elements being mounted on the stud pin 112. The release shaft 125 functions also as an operation member as will be described later. The cap 128 is fitted in the release shaft 125. Between the release shaft 125 and the stud pin 112 there is disposed a spring 129 whose spring force is stronger than that of the latch spring 127. The detailed forms of the latch member 110 and the release shaft 125 are shown in FIGS. 14 and 15 respectively. The latch member 110 has a pair of cutouts 130 whereas the release shaft 125 has a pair of correspondingly shaped projections 131 (only one of which is shown in FIG. 15). The latch member 110 and the release shaft 125 are joined together by aligning the projections 131 with the cutouts 130, passing the release shaft 125 through the opening 132 of the latch member 110 and then rotating the shaft 125 about 45° counterclockwisely.

The release shaft 125 has an axial through-hole for receiving the pin 112. On the both sides of the lower portion of the through-hole there is formed a space 133 extending radially and outwardly. At the upper portion of the through-hole there is formed a sectorial in section space 134, the center angle of the sector being about 45°. The upper space 134 communicates with the lower space 133. As will be described later, the two spaces 133, 134 and the pin 112 serve as means for allowing the second step motion of a two-step operation.

Figure 16:
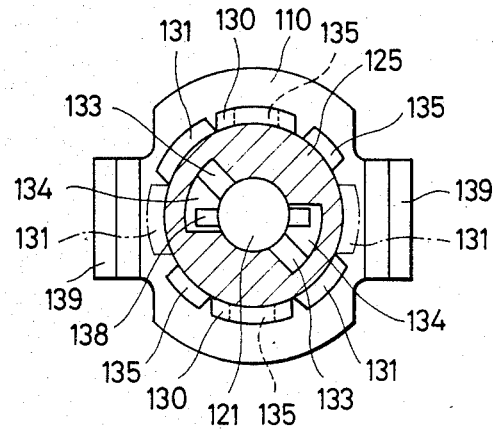
FIG. 16 is a view illustrating the manner of operation of the seoond embodiment.

The release shaft 125 has also another pair of projections 135 provided at positions above the first pair of projections 131 and about 90° shifted from the positions of the latter. The first projections 131 are always on the side of the lower surface of the latch member 110. The second projections 135 are on the side of the upper surface of the latch member when the projections are out of alignment with the cutouts 130 of the latch member. However, if the projections 135 are in alignment with the cutouts 130, the projections can be moved into the cutouts 130. This positional relation between projections 131, 135 and cutouts 130 is also shown in FIG. 16.

The latch spring 127 is anchored to the release shaft 125 at its upper end. The low end portion of the latch spring passes through the spring cover 126 and then is anchored at the hole 136 of the latch member 110.

The release shaft 125 is axially movable through an E-ring 137 within a determined distance range. The release shaft 125 is rotatable within a range of about 45° only when the projection 138 of the pin 112 lies in the sectorial space 134.

The manner of operation of the second embodiment is as follows:

After putting on the seat belt, the wearer can adjust the position of the shoulder belt if it is unsuitable to him. In this case, the adjustment is carried out by changing the position of the through-anchor 103 which the shoulder belt passed through.

At first, the wearer rotates the release shaft 125 about 45° counter-clockwise as viewed in FIG. 16 starting from the position of the mechanism 104 shown in FIG. 13.

By this counter-clockwise rotation of the release shaft 125, the first and second projections 131 and 135 on the shaft 125 are moved from the starting positions indicated by the solid line to the positions suggested by the dotted line in FIG. 16. At the same time, the space 133 is moved to the position suggested by the phantom in FIG. 13. In this position, the space 133 is in alignment with the projection 138 of the pin 112. Since the spring cover 126 and the latch member 110 are united together by the lower leg portion of the latch spring 127, the spring cover 126 does not rotate at this stage of operation, and the spring 127 gets in the state in which a spring force is stored in the spring in respect of rotation.

As the projection 138 and the space 133 are now in alignment with each other, the release shaft 125 is allowed to move axially. In this state, the wearer moves the release shaft 125 upwardly as viewed in FIG. 13 against the force of the spring 129. Since the projections 131 and the latch member 110 are in engagement, the latch member 110, spring cover 126 and spring 127 are together moved upwards by this second step of operation. The leg portion 139 of the latch member 110 is disengaged from the latch portions 105 of the base 101. Thus, the adjust anchor 102 is rendered movable relative to the base 101. The position of the release shaft 125 after the pull-up is suggested by the phantom in FIG. 11.

In the unlatched state, the wearer moves the adjustable anchor 102 along the base 101 while gripping the release shaft 125 with his hand. After moving the adjustable anchor 102 to a suitable position along the base 101, the wearer stops pulling up the release shaft 125. At the time, if the leg portion 139 of the latch member 110 and the latch portion 105 of the base 101 are in alignment with each other, then the release shaft 125 will be moved back downwardly by the stored force of the spring 129, and at the same time, the latch member 110 is also moved down by the force of the latch spring 127. Immediately after that, the release shaft 125 will be rotated clockwisely by the force of the latch spring 127. Thus, the release shaft will be returned to the position for latch as shown in FIG. 13.

If the leg portion 139 of the latch member 110 is out of alignment with the latch portion 105 of the base 101, only the release shaft 125 will be moved back to the position shown in FIG. 13 by the force of the spring 129. This is because, in this case, the projections 135 of the release shaft can fall into the cutouts 130 of the latch member. But, the latch member 110 can not completely be moved back to the position for latch. The bent portion (or the narrow-spaced portion) of the legs 139 of the latch member 110 abuts against the base 101 and therefore the latch member can not further move downwardly. As a result the spring cover 126 moves upwardly relative to the release shaft 125 and the spring 127 having a relatively weak spring force is compressed. In this case, the wearer moves the adjustable anchor 102 a little further until the latch member 110 gets in alignment with the latch portions 105 of the base. When the alignment is obtained, the latch member 110 is moved downwardly together with the spring cover 126 by the stored spring force of the spring 127. After that, the release shaft 125 rotates clockwisely and the latch member 110 is completely returned to the position for latch as shown in FIG. 13. In this manner, the adjustable anchor is automatically latched in the new set position relative to the base by the latch member. The thing necessary for the wearer to obtain the new latched state is only to operate the release shaft 125 simply with his hand.

In this latched state, the release shaft 125 is fixed against vertical movement because the lower portion of the release shaft is sandwiched in between the adjustable anchor 102 and the projection 138 now lying in the sectorial space 134. Also, the latch member 110 is fixed against movement because it is sandwiched in between the first projections 131 and the second projections 135 of the release shaft 125.

Figure 17:
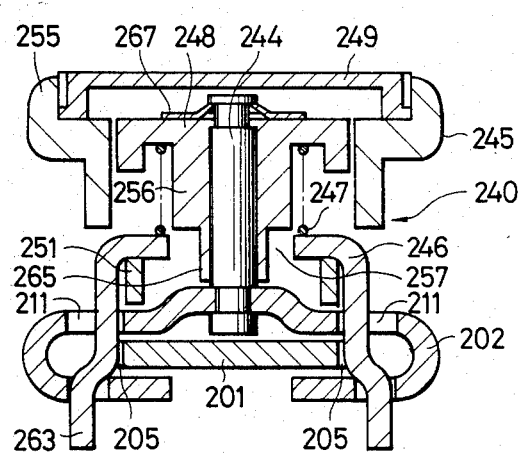
FIGS. 17 and 18 are views similar to FIG. 13 but showing a third embodiment of the invention.
Figure 18:
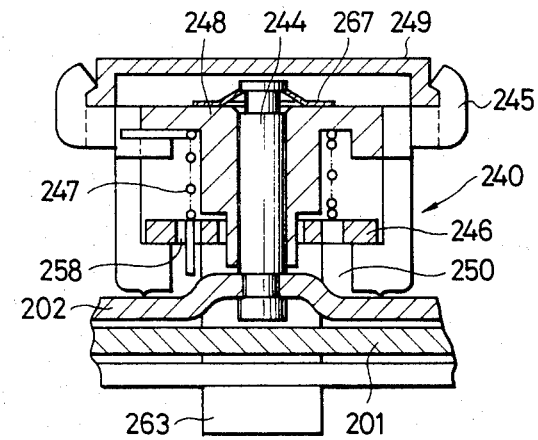

FIGS. 17 and 18 show a third embodiment of the invention.

The base of the third embodiment is designated by a reference numeral 201 and the adjustable anchor by a reference numeral 202. The anchor latch/unlatch mechanism (or the anchor setting mechanism) by which the anchor 202 is fixed in a set position or unlatched for movement relative to the base 201 is generally designated by a reference numeral 240. FIG. 17 is a sectional view of the mechanism 240 taken across the base 201 and FIG. 13 is another sectional view of the mechanism 240 taken along the length of the base.

Figure 19:
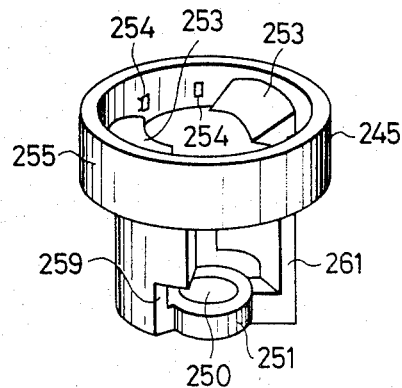
FIGS. 19 to 21 are detailed perspective views of the respective members of the third embodiment.
Figure 20:
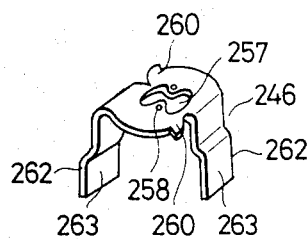
Figure 21:
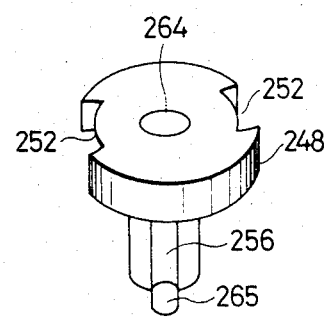

The mechanism 240 is mounted on a pin 244 and comprises a release button 245, a latch member 246, a latch spring 247, a release shaft 248 and a cap 249 fitted in the release button. The detailed forms of the release button 245, latch member 246 and release shaft 248 are shown in FIGS. 19, 20 and 21 respectively.

The release button 245 has a lower portion 251 having a center through-hole 250 for the pin 244, and an upper operation portion 255 provided with a pair of inward projections 253 engageable with the corresponding cutouts 252 of the release shaft 248 and small projections 254 for gripping the cap 249. The lower portion 251 is so formed that the latch member 246 can sit on it astride.

The latch member 246 has central opening 257 shaped as shown a pair of small holes 258, a pair of stopper portions 260 and two leg portions 263. The central opening 257 allows the pass-through of not only the pin 244 but also the middle portion 256 of the release shaft which has also such a cross section as of the central opening 257. The small holes 258 are provided for receiving the lower leg portion of the spring 247. The stopper portions 260 provide one limit end of the rotation range of the release button 245. When the release button is rotated in a direction, the portions 259 of the release button abut against the stopper portions 260 of the latch member 246. To determine another limit end of the rotation range of the release button, the leg portions of the latch member 246 have end surfaces 262 against which the portions 261 of the release button 245 abut when the latter is rotated in another direction. Like the above embodiments, the legs 263 of the latch member are stepped at the middle so as to form a narrow-spaced portion engageable with the latch portion 205 of the base 201.

Figure 23:
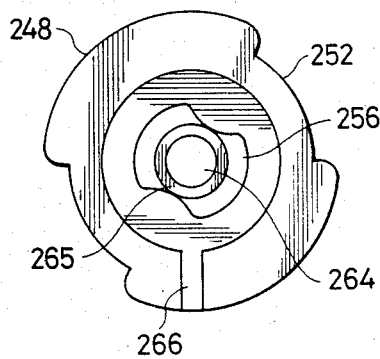
FIG. 23 is a bottom view of the release shaft.

The release shaft 248 has a central through-hole 264 for the pin 244, a slit 266 (FIG. 23) for anchoring the upper leg portion of the spring 247, the above-mentioned cutouts 252, the above-mentioned middle portion 256 having such a cross section as shown in FIG. 23, and a lower cylindrical portion 265.

Figure 22:
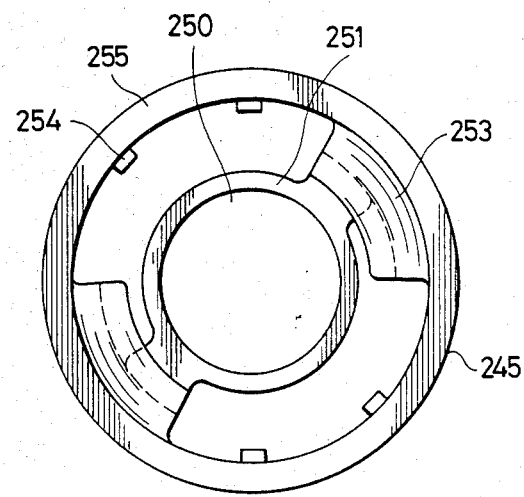
FIG. 22 is a top view of the release button in the third embodiment.

The release button 245 and the release shaft 248 are also shown in FIGS. 22 and 23 which are a top view and a bottom view thereof after assembled.

The release shaft 248 is mounted on the pin 244 through an E-ring 267 which allows the release shaft to rotate about the pin but does not allow it to move axially along the pin. The release button 245 is rotatable together with the release shaft 248 within the above-mentioned range of rotation. The release button 245 is also axially movable together with the latch member 246.

The manner of operation of the third embodiment is as follows:

In the latched state (latch effective state) as shown in FIGS. 17 and 18, the center opening 257 of the latch member 246 and the portion 256 of the release shaft 248 are shifted from each other. The latch member 246 is sandwiched in between the portion 256 of the release shaft and the lower portion 251 of the release button. Therefore, the latch member 246 is fixed in the position for latch and is not movable. The positional relation between the latch member 246 and the release shaft 248 in this state is seen in FIG. 24.

Figure 24:
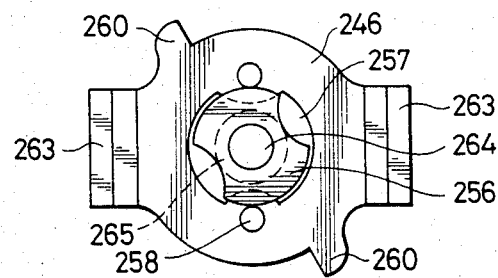
FIG. 24 is a view illustrating the manner of operation of the third embodiment.

When it is wished to disengage the latch member 246 from the latch portion 205 of the base 201, the belt wearer grips the release button 245 and turns it together with the release shaft 248 about 45° counter-clockwisely as viewed in FIG. 24. By this rotation, the particularly shaped portion 256 of the release shaft is brought into alignment with the corresponding central opening 257 of the latch member. Therefore, the latch member 246 is allowed to move upwardly relative to the release shaft 248. The spring 247 gets in the state in which a spring force is stored therein in respect of rotation.

Subsequent to the rotation, the wearer pulls up the release button 245 against the force of the spring 247. Thereby, the latch member 246 is moved up together with the release button 245 to release it from the latched state. After unlatching in the above manner, the wearer moves the adjustable anchor 202 to any desired position along the base 201 while holding his hand on the release button. When the adjustable anchor 202 reaches the new position and if the latch member 246 is in alignment with the latch portion 205 of the base at the new set position, the latch member 246 will be moved downwardly together with the release button 245 automatically by the force of the spring 247 as soon as the wearer stops the pull-up of the button 245. Subsequent to it, the release shaft 248 will be automatically rotated together with the release button clockwisely. Thus, the mechanism is returned to the position for latch and an adjustment of position is completed.

If the latch member 246 and the latch portion 205 of the base are out of alignment at the new position, the wearer has to move the adjustable anchor a little further until the alignment is obtained. By doing so, in this case also, the mechanism can be automatically brought into the position for latch in the same manner as in the above-described first and second embodiments.

Like the first embodiment, these second and third embodiments may be variously modified. For example, according to the mounting position of the base, the through-anchor may be replaced by a retractor or the like. Further, the latch positions may be set steplessly instead of the discrete arrangement as shown in the above embodiments.

I claim:

1. A device for adjusting the support position of a seat belt in a seat belt system comprising:
    a base;
    an adjustable anchor to be guided along said base;
    a belt-supporting member provided on said anchor;
    a latch member mounted on said anchor for movement between an engagement position in which said latch member is engageable with said base to fix said adjustable anchor to said base and a non-engagement position in which said latch member is out of engagexent with said base so as to render said adjustable anchor movable along said base;
    an operation member, said operation member bringing said latch member from said engagement position to said non-engagement position through a two-step operation in two different directions of said operation member; and
    operation transmission means for transmitting to said latch member the second step motion of the two-step operation when said operation member is operated by the two-step operation so as to bring said latch member from the engagement position to the non-engagement position.

2. A device according to claim 1, wherein the operation transmission means includes a release member for engaging with the operation member only after the first step motion of the two-step operation is completed so as to transmit to the latch member the second step motion of the operation member.

3. A device according to claim 2, wherein the operation member is urged towards such a position as being disengaged from said release member.

4. A device according to claim 2, wherein the operation transmission means includes a member for transmitting the movement of said release member to said latch member with a change of the movement direction of the latch member.

5. A device according to claim 2, wherein the latch member is urged towards the engagement position.

6. A device for adjusting the support position of a seat belt in a seat belt system comprising:
    a base;

adjustable anchor to be guided along said base;
a seat-supporting member provided on said adjustable anchor;
a latch member mounted on said anchor for movement between an engagement position in which said latch member is engageable with said base to fix said adjustable anchor to said base and a non-engagement position in which said latch member is out of engagement with said base so as to render said adjustable anchor movable along said base;
an operation member, said operation member bringing said latch member from said engagement position to said non-engagement position through a two-step operation in two different directions of said operation member; and
means for allowing the second step motion of the two-step operation of said operation member only after the first step motion of the two-step operation being completed.

7. A device according to claim 6, wherein the first step motion of said operation member is a rotational movement and the second step motion of said operation member is parallel to the movement of the latch member between the engagement position and the non-engagement position.

* * * * *